United States Patent
Dube et al.

[15] 3,665,765
[45] May 30, 1972

[54] BI-MATERIAL CONDITION SENSING MEANS

[72] Inventors: Victor J. Dube, West Allis; Paul E. Thoma, Milwaukee; Jao Shiun Kao, Wauwatosa, all of Wis.

[73] Assignee: Johnson Service Company, Milwaukee, Wis.

[22] Filed: Apr. 11, 1968

[21] Appl. No.: 720,684

[52] U.S. Cl. .................................................73/337, 73/363
[51] Int. Cl. ....................................G01m 19/10, G01k 5/62
[58] Field of Search .................73/337, 363.3, 363.1, 363.5, 73/378.3, 363

[56] References Cited
UNITED STATES PATENTS

| | | | |
|---|---|---|---|
| 3,461,723 | 9/1969 | Thoma | 73/337 |
| 1,822,069 | 9/1931 | Thomas | 73/378.3 |

*Primary Examiner*—Louis R. Prince
*Assistant Examiner*—Denis E. Corr
*Attorney*—Andrus, Sceales, Starke and Sawall

[57] ABSTRACT

A bi-material temperature and/or humidity sensor including a circular disc which is mounted in fixed relation about the periphery. A flexible metal base member has a second material bonded to the center or to the outer portion to form a bi-material element. The second material is made of a substantially smaller area.

23 Claims, 8 Drawing Figures

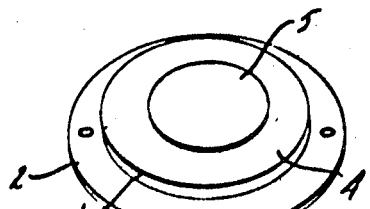
FIG.1
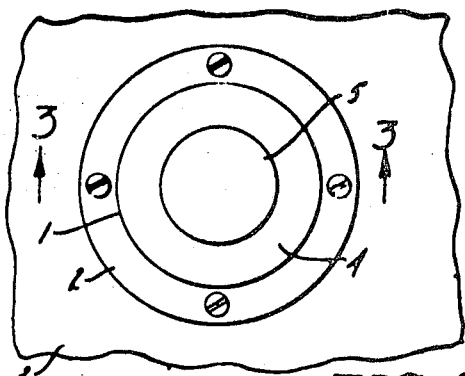
FIG.2
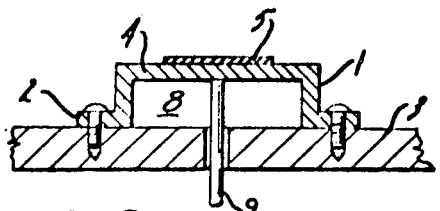
FIG.3
FIG.4
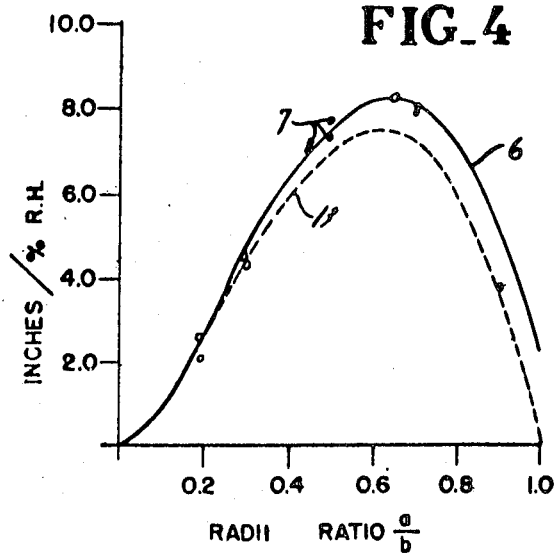
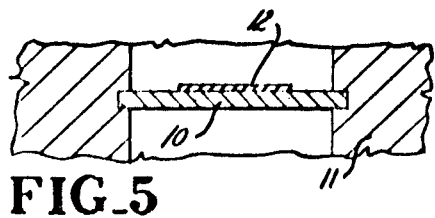
FIG.5
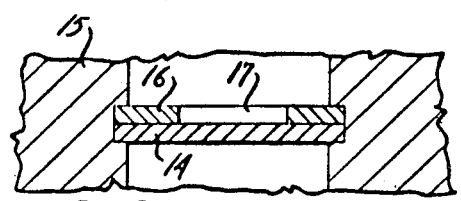
FIG.6
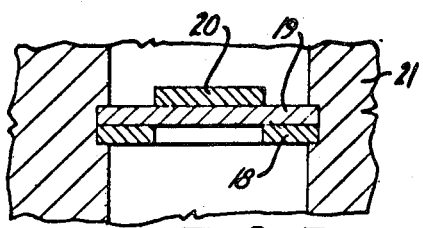
FIG.7
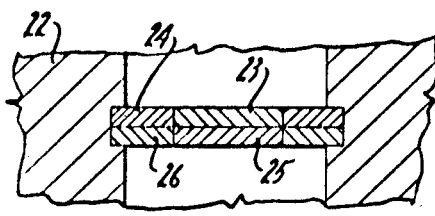
FIG.8

BI-MATERIAL CONDITION SENSING MEANS

This invention relates to bi-material condition sensing means for sensing and/or controlling any condition or environment which effects a different dimensional change in one material with respect to another and particularly for sensing and/or controlling humidity, temperature and the like.

Bi-material sensors have been widely employed in the environmental control field to sense and to control humidity and temperature conditions. Generally, bi-material sensors have employed two different materials bonded in superimposed relation with the materials having a different coefficient of expansion and contraction with respect to the sensed condition. Generally, the materials are selected to include a flexible base member which is essentially insensitive to the condition and a second material which is substantially sensitive to the condition. As a result, any change in the condition results in a differential movement of the two materials with a resultant deflection of the bi-material sensor. The more common variety employs a cantilevered beam or plate having a bi-material deflection sensing unit secured to or forming a part of the free end thereof. Although such systems provide a satisfactory means for sensing of temperature and/or humidity, the elemental associated components are subject to corrosion and collection of foreign particles from the surrounding atmosphere. There is also a substantial need for a sensor which can define an enclosure. Further, the present construction provides for varying of the deflection only by a change in material and/or a change in the relative thickness of the two layers of the two materials.

A bistable sensor producing a snap action type control employs a circular plate or shell which is simply supported to allow relative movement with respect to a support means such that actual deflection results in response to changes in a sensed condition. The construction of a suitable support for the bi-material disc type units has presented difficulties which have so limited the application such that simply supported bi-material discs are generally employed in bistable, snap action temperature controls and not in proportional controls or in humidity controls.

Thus, the disc type element cannot be rigidly mounted about the edge without complete loss of deflection. A shell-type construction having a cup-shaped member with the base portion covered with a second material has also been tried. The unit is similar to a rigid mounting and very little deflection is detected.

Although various suitable bi-materials have been known and employed for many years for sensing temperature and humidity conditions, U.S. Pat. No. 3,301,057 and the copending application of Paul E. Thoma entitled Synthetic Humidity Sensing Element and Method of Preparing the Same, which was filed on July 10, 1967 with Ser. No. 652,287, now U.S. Pat. No. 3,461,723 disclose particularly satisfactory humidity sensitive materials of a synthetic composition for detection of humidity conditions. The materials have good physical strength and more linear humidity coefficients of dimensional change with humidity which makes them particularly suitable for proportional controls.

The present invention is particularly directed to an improved bi-material sensing device particularly of the disc type including integral means to control the deflection sensitivity of the unit. The sensitivity of the unit is defined as the per unit deflection per unit change in the sensed condition such as the relative humidity or temperature or other condition which causes the material to expand and contract.

Generally, in accordance with the present invention, the sensing device is a disc or wafer element including a generally flat or substantially planar base member having a selected coefficient of expansion and forming a support for the sensor element. The member is provided with a fixed mounting at the periphery. The other or second material is applied and bonded to the base member in any suitable manner to form a bi-material element, but is made of a substantially smaller configuration to define a free portion or area of the first material or element. The free portion or area in accordance with an important aspect of the present invention is symmetrically arranged with respect to the support and the second material. Applicants have found that with this new construction, the peripheral portion may be essentially fixed and an appreciable deflection of the bi-material element not connected to the mounting means obtained. This differential area construction thus establishes a simple mounting for a disc type sensor and permits complete enclosure of one side of a proportional sensing element from the environment in which the sensor is mounted.

The bi-material element may take a variety of different preferred configurations of overlying bonded materials employing a base member to which an outer ring-shaped and/or a central disc-shaped second material is bonded.

As applied to a preferred circular member, the second material is applied to the mounting member as a central disc having a substantially smaller radius than the mounting member or as a ring member with a substantial central opening. The bi-material element is essentially fixedly mounted about the periphery to prevent movement thereof.

Applicants have found that the sensitivity of the device is related to and controlled by the relative areas or radii of the two materials and that an optimum ratio exists. Further, the optimum ratio can, at least for a circular disc for sensing temperature and/or humidity, be readily defined in a mathematical equation. Generally, it has been found that the sensitivity increases to a maximum as the relative area and radius of the applied or second material is decreased to a selected ratio but that continued reduction results in a decreasing sensitivity.

Alternatively, the sensor may also be constructed in accordance with the present invention with materials having different coefficients of expansion defining an inner portion of a disc and the same or similar, but oppositely disposed, materials defining the outer portion of the disc.

The present invention provides a very simple and reliable means of providing a fixed type sensor which can be readily mass produced with controlled sensitivity. The simplified mounting permitted by the present invention thus provides a highly satisfactory deflection sensing device which can be readily placed within an enclosed environment.

Further, a cross-linked material such as disclosed in the previously identified copending application of Paul E. Thoma produces an unusually satisfactory and operative humidity sensor of the disc type with the outer edge fixed. The characteristics of the cross-linked material and particularly the moisture sensitivity, the bonding quality and resistance to chemical attack produce an unusually satisfactory deflection of the disc element.

The drawing furnished herewith illustrates preferred constructions of the present invention in which the above advantages and features are clearly disclosed, as well as others which will be readily understood from the following description.

In the drawing:

FIG. 1 is a pictorial view of a cylindrical shell bi-material sensor constructed in accordance with the present invention;

FIG. 2 is a top view of the sensor shown in FIG. 1;

FIG. 3 is a vertical section taken on line 3—3 of FIG. 2;

FIG. 4 is a graphical illustration showing the sensitivity of a unit constructed as shown in FIGS. 1–3 and 5 with varying radii of one of the bi-material elements or materials;

FIG. 5 is a vertical section of a rigidly mounted sensor element;

FIG. 6 is a view similar to FIG. 5 showing a further construction;

FIG. 7 is a view similar to FIG. 6 showing another construction in accordance with the present invention; and FIG. 8 is a view similar to FIG. 5 showing an alternative construction of the sensor element.

Referring to the drawing and particularly to FIGS. 1–3, a bi-material sensor which by proper selection of materials can be employed to sense a temperature, humidity or other condition is shown constructed in accordance with the present invention. The present invention may when combined with the humidity sensing material of the previously identified application provide an unusually satisfactory humidity sensing apparatus and the illustrated embodiments are described in connection with such a novel humidity sensor. The illustrated sensor includes a cylindrical supporting shell 1 defining a generally cup-shaped member having a mounting flange 2 integral with the peripheral edge thereof. The illustrated flange 2 is apertured for bolting or otherwise securing of the sensor to a support 3 within a suitable environment. The cylindrical shell 1 is designed with a base 4 of a selected radius and of a flexible material having a selected coefficient of humidity expansion with respect to the humidity condition to be sensed.

A second material layer or coating 5, of a substantially different coefficient of expansion than that of the base 4, is applied to the outer face of the base 4 in the illustrated embodiment of the invention to define a bi-material sensor. The element 5 may be a completely separate fabricated member suitably bonded throughout its interface to the base of shell 1 or may be a deposited layer or coating. For example, the previously identified patent and copending application of Paul E. Thoma disclose satisfactory synthetic materials for defining a varying dimension humidity sensing element. Generally, the materials noted in the patent provide satisfactory synthetic humidity sensitive materials including an organic polymer being substantially free of hydroxyl, carboxyl, amino and imino groups. As more fully developed in the copending application, an exceptionally satisfactory material for layer 5 is one attached by cross-linking such as cellulose acetate butyrate (37 percent combined butyryl) which is cross-linked with urea-formaldehyde. Applicants have applied such material to a shell of aluminum (alloy 110-0) which was first zinc plated and then copper plated by flash coatings. The surface of the copper may be oxidized to further improve the adhesion of the cross-linked cellulose acetate butyrate layer 5 to the base 4.

The coefficient of humidity expansion of the above cellulose acetate butyrate is such that the material will generally show a dimensional increase greater than 1 percent with a change in relative humidity from 0 to 100 percent while the aluminum shows essentially no change because of a 0 humidity coefficient. The synthetic material is particularly significant in the present invention as applied to a humidity sensor because of its sensitivity characteristic and because it can be applied in an accurate and controlled manner with an excellent bond to a metal base material or member.

Although the significant factor in the present invention as in all bi-material sensors is the relative coefficients with respect to the conditions being sensed, a flexible base member having a zero or very low coefficient is normally selected in the practical construction.

In accordance with the illustrated embodiment of the invention, the applied second material layer 5 is formed with a substantially smaller radius than the base 4 and preferably equal to essentially 65 percent of the radius of the base for the following reasons.

Applicants have found that the base 4 with the layer 5 defines a disc unit, the sensitivity of which varies with the relative radii of the bi-material layer 5 and the base 4. In the particular construction, the deflection characteristic essentially conforms to the characteristics shown in FIG. 4. In the characteristics of FIG. 4, the sensitivity is shown on the vertical axis in inches per percent of humidity change and the relative radii is shown on the horizontal axis as the ratio of radius of the layer 5 to the radius of the base 4 of the shell. Generally, as the radius of layer 5 increases from zero, the deflection sensitivity also increases until at approximately 0.65 radii ratio, a maximum is reached after which the sensitivity decreases. With the bi-material layer 5 corresponding in diameter to that of the base 4, a very minute and essentially zero deflection sensitivity results.

Applicants have found that the sensitivity characteristic of a shell type unit as shown in FIGS. 1–3 is essentially dependent upon the following parameters and definitions, wherein the subscript $a$ refers to the layer 5 and the subscript $b$ refers to the base 4:

NOMENCLATURE $a$ = Radius of layer 5
$b$ = Radius of layer or base 4
$E_a$ = Modulus of elasticity for material $a$
$E_b$ = Modulus of elasticity for material $b$
$h_a$ = Thickness of material $a$
$h_b$ = Thickness of material $b$
$\alpha_a$ = Expansion coefficient due to temperature for material $a$
$\alpha_b$ = Expansion coefficient due to temperature for material $b$
$\beta_a$ = Expansion coefficient due to humidity for material $a$
$\beta_b$ = Expansion coefficient due to humidity for material $b$
$\nu$ = Poisson's ratio (assumed to be equal for both materials)
$S$ = Deflection at the center
$\Delta T$ = Change in temperature
$\Delta RH$ = Change in relative humidity
$W$ = Deflection at the center per unit change of stimulus (relative humidity or temperature)

Furthermore, applicants have derived the following equation which defines the sensitivity characteristic of a cylindrical shell humidity sensor, as shown in FIG. 4 in terms of said variable with the temperature coefficients of both materials ($\alpha_a$ and $\alpha_b$) equal to 0 or to each other or the temperature condition held constant and the humidity coefficient of the base ($\beta_b$) is equal to essentially 0:

$$W = [B_a (C_{41} + h_a/2) - C_a (1 + C_{42})] \frac{a^2 N_t}{2C_1} + (C_{49} + C_{50}) \frac{N_t}{C_2}$$

where:

$$B_a = \frac{E_a h_a + E_b h_b}{1 - \nu^2}$$

$$C_a = \frac{E_a h_a^2 - E_b h_b^2}{2(1 - \nu^2)}$$

$$D_a = \frac{E_a h_a^3 + E_b h_b^3}{3(1 - \nu^2)}$$

$$B_b = \frac{E_b h_b}{1 - \nu^2}$$

$$C_b = \frac{E_b h_b^2}{2(1 - \nu^2)}$$

$$D_b = \frac{E_b h_b^3}{3(1 - \nu^2)}$$

$$B_c = \sqrt[4]{\frac{3(1 - \nu^2)}{h_b^2 b^2}}$$

$$D_c = \frac{E_b h_b^3}{12(1 - \nu^2)}$$

$$N_t = \frac{E_a h_a \beta_a}{1 - \nu}$$

$$C_0 = b^2 (1 - \nu) + a^2 (1 + \nu)$$
$$C_1 = (D_a B_a - C_a^2)(1 + \nu)$$
$$C_2 = (D_b B_b - C_b^2)(1 - \nu^2)(b^2 - a^2)$$
$$C_3 = b^2 (1 + \nu) + a^2 (1 - \nu)$$
$$C_4 = a B_b C_3 / C_2$$
$$C_5 = a C_b C_3 / C_2$$

$C_6 = a D_b C_3 / C_2$
$C_7 = 2 b^2 a B_b / C_2$
$C_8 = 2 b^2 a C_b / C_2$
$C_9 = 2 b^2 a D_b / C_2$
$C_{10} = a B_a / C_1$
$C_{11} = a C_a / C_1$
$C_{12} = a D_a / C_1$
$C_{13} = 1(2 B_c^3 D_c)$
$C_{14} = 1/(2 B_c^2 D_c)$
$C_{15} = 1/(B_c D_c)$
$C_{16} = b B_b C_o / C_2$
$C_{17} = b C_b C_o / C_2$
$C_{18} = b D_b C_o / C_2$
$C_{19} = 2 a^2 b B_b / C_2$
$C_{20} = 2 a^2 b C_b / C_2$
$C_{21} = 2 a^2 b D_b / C_2$
$C_{22} = -(C_{10} + C_4)$
$C_{23} = -C_5 + C_{11}$
$C_{24} = -C_5 + C_{11}$
$C_{25} = -(C_{12} + C_6)$
$C_{26} = -(C_{15} + C_{16})$
$C_{27} = -(C_{14} + C_{17})$
$C_{28} = -(C_{14} + C_{17})$
$C_{29} = -(C_{13} + C_{18})$
$C_{30} = (C_{10} h_a/2) - C_{11}$
$C_{31} = C_{12} - (C_{11} h_a/2)$
$C_{32} = C_{25}(C_{26} C_{29} - C_{27} C_{28}) - C_{20}(C_8 C_{29} - C_9 C_{28}) + C_{21}(C_8 C_{27} - C_9 C_{26})$
$C_{33} = C_{24}(C_{26} C_{29} - C_{27} C_{28}) - C_{19}(C_8 C_{29} - C_9 C_{28}) + C_{20}(C_8 C_{27} - C_9 C_{26})$
$C_{34} = C_9(C_{19} C_{21} - C_{20}^2) - C_{27}(C_{24} C_{21} - C_{25} C_{20}) + C_{29}(C_{24} C_{20} - C_{25} C_{19})$
$C_{35} = C_8(C_{19} C_{21} - C_{20}^2) - C_{26}(C_{24} C_{21} - C_{25} C_{20}) + C_{28}(C_{24} C_{20} - C_{25} C_{19})$
$C_{36} = C_{23}(C_{26} C_{29} - C_{27} C_{28}) - C_{20}(C_7 C_{29} - C_8 C_{28}) + C_{21}(C_7 C_{27} - C_8 C_{26})$
$C_{37} = C_{22}(C_{26} C_{29} - C_{27} C_{28}) - C_{19}(C_7 C_{29} - C_8 C_{28}) + C_{20}(C_7 C_{27} - C_8 C_{26})$
$C_{38} = C_8(C_{19} C_{21} - C_{20}^2) - C_{27}(C_{22} C_{21} - C_{23} C_{20}) + C_{29}(C_{22} C_{20} - C_{23} C_{19})$
$C_{39} = C_7(C_{19} C_{21} - C_{20}^2) - C_{26}(C_{22} C_{21} - C_{23} C_{20}) + C_{28}(C_{22} C_{20} - C_{23} C_{19})$
$C_{40} = C_{22} C_{32} - C_{23} C_{33} + C_7 C_{34} - C_8 C_{35}$
$C_{41} = (C_{30} C_{32} - C_{31} C_{36}) / C_{40}$
$C_{42} = (-C_{30} C_{33} + C_{31} C_{37}) / C_{40}$
$C_{43} = (C_{30} C_{34} - C_{31} C_{38}) / C_{40}$
$C_{44} = (-C_{30} C_{35} + C_{31} C_{39}) / C_{40}$
$C_{45} = b^2 C_{43} - a^2 C_{41}$
$C_{46} = b^2 C_{44} - a^2 C_{42}$
$C_{47} = B_b C_{45} + C_b C_{46}$
$C_{48} = B_b(C_{41} - C_{43}) + C_b(C_{42} - C_{44})$
$C_{49} = C_{47}(b^2 - a^2)(1 + \nu) \frac{1}{2}$ $C_{50} = b^2 a^2 C_{48}(1 + \nu) \ln\left[\frac{a}{b}\right]$ The same equation is equally applicable to a temperature sensor wherein the humidity coefficients are equal to zero or to each other or the humidity is held constant and the temperature coefficient of the base ($\alpha_b$) is essentially zero. The term $N_t$ however would be replaced with the term $N_H = (E_a h_a \alpha_a)/(1 \nu)$.

In an actual construction similar to that shown in FIG. 1, actual experimental results for a number of different radii are shown in FIG. 4 by the several circled dots 7 and are seen to very closely agree with the characteristic curve 6 as defined by the mathematical equation. The base metal and the applied element were as previously identified and had the following material constants and dimensions:

$E_a = 0.147 \times 10^6$ psi
$E_b = 10 \times 10^6$ psi
$\beta_a = 2 \times 10^{-4}$ in/in/% RH
$\beta_b = 0$
$\nu = 0.32$
$h_a = 2 \times 10^{-3}$ in.
$h_b = 8.4 \times 10^{-3}$ in. and
$b = 1$ in.

The experimental result discloses a similar maximum sensitivity at relative radii ratio of 0.65 for the humidity sensor constructed of the previously identified materials and similar materials. As the material constants and the dimensions control the final characteristic generally, however, no definite optimum ratio for all designs of the sensors can be set forth. However, such determination can be readily obtained by any simple test procedure, solving of the analytical equation with a computer or the like.

The shell 1 mounted on the support 3 defines an enclosed chamber 8 within which components can be secured and protected from the surrounding environmental dirt, moisture and the like. Thus, in the drawing, an output element 9 is diagrammatically shown connected to the substrate or base 4.

An alternative construction is shown in FIG. 5 wherein a base or substrate plate 10 of circular configuration is rigidly fixed about its periphery in a mounting fixture or wall 11. The plate 10 corresponds to the base 4 of the shell 1 of the first embodiment. The second material or layer 12 of the bi-material structure is bonded or otherwise secured to the central portion of the plate and is provided with a selected smaller radius to produce the desired deflection characteristic.

The applicants have devised a similar equation for the total deflection of such an element in response to both temperature and humidity conditions, as follows:

$$S = \frac{a^2}{C_1}\left[\frac{b^2 - a^2}{2} + b^2 \ln\left[\frac{a}{b}\right]\right][C_b N_o + B_b M_o]$$

$$+ \frac{1}{2}\frac{a^2}{C_2}[B_a(M_{t1} + M_{H1} + M_o) - C_a(N_{t1} + N_{H1} + N_o)]$$

where $$N_{t1} = \frac{E_a h_a \alpha_a + E_b h_b \alpha_b}{1 - \nu} \Delta T$$

$$N_{H1} = \frac{E_a h_a \beta_a + E_b h_b \beta_b}{1 - \nu} \Delta RH$$

$$M_{t1} = \frac{E_a h_a^2 \alpha_a - E_b h_b^2 \alpha_b}{2(1 - \nu)} \Delta T$$

$$M_{H1} = \frac{E_a h_a^2 \beta_a - E_b h_b^2 \beta_b}{2(1 - \nu)} \Delta RH$$

$$N_o = \frac{C_{301} C_{701} + C_{401} C_{601}}{C_{401}^2 - C_{301} C_{501}}$$

$$M_o = -\frac{C_{601} C_{501} + C_{401} C_{701}}{C_{401}^2 - C_{301} C_{501}}$$

$$C_{101} = (D_b B_b - C_b^2)[b^2(1 - \nu) + a^2(1 + \nu)]$$

$$C_{201} = (D_a B_a - C_a^2)(1 + \nu)$$

$$C_{301} = \frac{(b^2 - a^2) B_b}{C_{101}} + \frac{B_a}{C_{201}}$$

$$C_{401} = \frac{(b^2 - a^2) C_b}{C_{101}} + \frac{C_a}{C_{201}}$$

$$C_{501} = \frac{(b^2 - a^2) D_b}{C_{101}} + \frac{D_a}{C_{201}}$$

$$C_{601} = \frac{C_a(N_{t1} + N_{H1}) - B_a(M_{t1} + N_{H1})}{C_{201}}$$

$$C_{701} = \frac{D_a(N_{t1} + N_{H1}) - C_a(M_{t1} + M_{H1})}{C_{201}}$$

and wherein $B_a$, $C_a$, $D_a$, $B_b$, $C_b$ and $D_b$ are as previously defined.

The above equation may be reduced to define a humidity sensitive element for comparison with the characteristic of the shell unit by setting of $\Delta T$ to 0 and the humidity coefficient of the substrate or base to 0. Plotting of the modified equation defines a similar characteristic, shown by curve 13 in FIG. 4 which essentially corresponds to the characteristic curve 6 for the shell construction. Curve 13 is shown in dashed line and superimposed on the characteristic curve 6 of the shell unit in FIG. 4 for clearly showing the effect of the rigid mounting. The latter characteristic curve 13 was obtained employing the same material constants and element dimensions. The fixed unit of FIG. 5 exhibits a similar maximum sensitivity at about 0.65 radii ratio although the total deflection was somewhat less. The deflection sensitivity however is 0 when the layer 12 and base or substrate layer 10 are coextensive. This is in contrast to the shell unit where the coextensive layer construction provides some minute deflection. It appears from applicants' analysis of the new structure that, with coextensive layers which are fixed or rigidly mounted about the periphery, the deflection of the disc in the central portion is opposed by the outer portion such that there is essentially no deflection. The slight deflection of the shell unit may be explained by the slight give provided by the cylindrical side wall.

The deflection of the embodiment shown in FIG. 8 may be found from the following equation, also derived by the applicants, for any two materials employed in the structure of FIG. 8, wherein $a$ refers to the radius of the central materials 23 and 25 and $b$ refers to the radius of the element to the mounting:

$$S = \frac{1}{C_{111}} [B_a (M_{01} - M_{t1} - M_{H1}) + C_a (N_{01} + N_{t1} + NH_1)]$$

$$\left[ \frac{b^2 - a^2}{2} + b^2 \ln \left[ \frac{a}{b} \right] \right] + \frac{1}{C_{211}} [-C_a (N_{01} + N_{t1} + N_{H1})$$

$$+ B_a (M_{01} + M_{t1} + M_{H1})] \frac{a^2}{2}$$

where $N_{t1}$, $N_{H1}$, $M_{t1}$, $M_{H1}$, $B_a$, $C_a$ and $D_a$ are the same as previously set forth and $$N_{01} = \frac{\{C_a C_{311}^2 (B_a [M_{t1} + M_{H1}] - C_a [N_{t1} + N_{H1}]) + B_a C_{411}^2 (D_a [N_{t1} + N_{H1}] - C_a [M_{t1} + M_{H1}])\}}{C_{311}^2 C_a^2 - C_{411}^2 B_a D_a}$$

$$\frac{\{C_a C_{311} C_{411} (C_a [M_{t1} + M_{H1}] - D [N_{t1} + N_{H1}]) + D_a C_{311} C_{411} (C_a [N_{t1} + N_{H1}] - B_a [M_{t1} + M_{H1}])\}}{C_{311}^2 C_a^2 - C_{411}^2 B_a D_a}$$

$$C_{111} = (B_a D_a = C_a^2) \left[ \frac{b^2}{a^2} (1 - \nu) + (1 + \nu) \right]$$

$$C_{211} = (B_a D_a - C_a) (1 + \nu)$$

$$C_{311} = \frac{a}{C_{211}} + \frac{1}{C_{111}} \left( a - \frac{b^2}{a} \right)$$

$$C_{411} = \frac{a}{C_{211}} - \frac{1}{C_{111}} \left( a - \frac{b^2}{a} \right)$$

The embodiments of the invention illustrated in FIGS. 1–5 as described produce a similar upward deflection with increases in humidity conditions. If a reverse or opposite deflection is desired while maintaining the most active or responsive moisture sensitive layer to the same side of the base member, the structure of FIG. 6 may be employed.

In FIG. 6, a base member 14 is rigidly fixed within a support wall 15 similar to the mountings of FIG. 5. An annular second and moisture sensitive layer 16 is applied to the outer peripheral portion of member 14 and includes a substantial opening 17 defining a free area on member 14. The wafer or disc bi-material element of FIG. 6 will respond to an increasing humidity condition to cause a downward deflection of the element and the deflection characteristic will generally be that previously described and will be determined by relative radii of the base member 14 and the opening 17 which also defines the radial length or area of the material layer 16.

A modified embodiment of the condition sensor is shown in FIG. 7 wherein an annular condition sensitive layer 18 is applied to the bottom side of a base element 19. A disc-shaped layer 20 is applied to the top and center of the base member 19 and the wafer element is secured with a wall 21. If the base member 19 is formed of a material with a small or 0 humidity coefficient and layers 18 and 20 with a relatively high humidity coefficient, in accordance with the previous discussions of the drawing, the element will deflect upwardly, generally in accordance with the previous discussions of the actions of the other embodiments.

A further embodiment which in a thin layer element such as previously given approximating the embodiment of FIG. 7 is shown in FIG. 8 including a disc element similarly secured within a wall 22. In FIG. 8, the top and bottom coextensive but dissimilar multiple layers are intimately bonded to each other. The top layer includes a central circular disc portion 23 integrally formed within an outer encircling portion 24, the periphery of the latter being embedded within the wall 22. The bottom layer similarly includes a central circular disc portion 25 with an interconnected outer encircling portion 26. As illustrated by similar cross-sectioning, the upper central disc portion 23 and the lower outer portion 26 are of the same or similar material having a first coefficient while the lower central disc portion 25 and the upper encircling outer portion 24 are of the same or similar material having a coefficient different than the first coefficient.

Although a particular circular shell and plate disc construction have been illustrated, any other type of mounting for the units can be provided. Although the element sensitivity can be controlled by varying the several parameters noted at page 8, a significant aspect or feature of the present invention is ease of control afforded by controlling the relative radii of two materials in the form of disc elements essentially rigidly held.

We claim:

1. In a bi-material condition sensor adapted to establish a deflection in accordance with the sensed condition comprising,
    a flexible substantially planar base member of a material having a predetermined coefficient of expansion with respect to said condition,
    a second material having a selected different coefficient of expansion and being bonded at the interface to a selected portion of said base member, said selected portion being substantially less than the area of said base member to define a substantially planar bi-material element with said base member having a substantially uncovered portion, said bi-material element deflecting normal to said element, and
    fixed and rigid mounting means connected at opposite sides of said base member to said bi-material element to rigidly support said element and establish movement of only the portion of the element not connected to the mounting means with the movement of said element in a direction normal to the plane through said fixed mounting means.

2. The bi-material condition sensor of claim 1 wherein said fixed mounting means is connected essentially to the full periphery of said base member.

3. The condition sensor of claim 1 wherein said second material is symmetrically secured to the base member.

4. The bi-material condition sensor of claim 1 wherein said second material is integrally bonded throughout the interface to the central portion of said base member in substantially spaced relation to said fixed mounting means.

5. A bi-material sensor in accordance with claim 4 wherein the base member is rigidly held about its periphery.

6. The condition sensor of claim 1 wherein said base member is a circular plate and said mounting means is secured to the periphery thereof and said second material is secured to the center of the base member.

7. In a bi-material humidity and temperature sensor in accordance with claim 1 wherein the second material and the base are circular and the base is rigidly held about its periphery and the deflection of said sensor is defined by the following equation:

$$S = \frac{a^2}{C_1} \left[ \frac{b^2-a^2}{2} + b^2 \ln\left[\frac{a}{b}\right] \right] [C_b N_o + B_b M_o]$$

$$+ \frac{1}{2} \frac{a^2}{C_2} [B_a (M_{t1} + M_{H1} + M_o) - C_a (N_{t1} + N_{H1} + N_o)]$$

8. The condition sensor of claim 1 wherein said base member includes a normal projecting sidewall defining a cup-shaped shell having a peripheral mounting means, and said second material is integrally bonded throughout the interface to the outer surface of the base, the area of the second material being substantially less than said base and spaced from said sidewall.

9. The condition sensor of claim 8 wherein said base member is a cup-shaped shell having a peripheral mounting flange adapted to be interconnected with a member to define an enclosed chamber.

10. In a bi-material humidity sensor in accordance with claim 1 wherein the second material and the base are circular and the base is essentially rigidly held about its periphery and the sensitivity to humidity of said sensor is defined by the following equation:

$$W = [B_a (C_{41} + h_a/2) - C_a (1 + C_{42})] \frac{a^2 N_t}{2C_1} + (C_{49} + C_{50}) \frac{N_t}{C_2}$$

11. In a bi-material temperature sensor in accordance with claim 1 wherein the second material and the base are circular and the base is essentially rigidly held about its periphery and the sensitivity to temperature to said sensor is defined by the following equation:

$$W = [B_a (C_{41} + h_a/2) - C_a (1 + C_{42})] \frac{a^2 N_H}{2C_1} + (C_{49} + C_{50}) \frac{N_H}{C_2}$$

12. In a bi-material condition sensor adapted to establish a deflection in accordance with the sensed condition comprising
a generally flat sensing element having an outer bi-material peripheral portion and a bonded core, said peripheral portion having a high coefficient of expansion material to a first side and a relatively low coefficient of expansion material to a second side, said core having a low coefficient of expansion material to said first side and a relatively high coefficient of expansion material to said second side.

13. The condition sensor of claim 12, wherein said element is a circular plate and the first and second high coefficient of expansion materials are of the same material and have the same expansion coefficient values and the first and second low coefficient of expansion materials are of the same material and have the same expansion coefficient values.

14. In a bi-material humidity and temperature sensor in accordance with claim 1 wherein the second material and the base are circular and the base is rigidly held about its periphery, said second material and said base including an outer bi-material peripheral portion and a bonded core, said peripheral portion having a high coefficient of expansion material to a first side and a relatively low coefficient of expansion material to a second side, said core having a low coefficient of expansion material to said first side and a relatively high coefficient of expansion material to said second side and the deflection of said sensor is defined by the following equation:

$$S = \frac{1}{C_{111}} [B_a (M_{01} - M_{t1} - M_{H1}) + C_a (N_{01} + N_{t1} + N_{H1})]$$

$$\left[ \frac{b^2-a^2}{2} + b^2 \ln\left[\frac{a}{b}\right] \right] + \frac{1}{C_{211}} [-C_a (N_{01} + N_{t1} + N_{H1})$$

$$+ B_a (M_{01} + M_{t1} + M_{H1})] \frac{a^2}{2}$$

15. The condition sensor of claim 1 wherein said base member is a circular plate and said mounting means is secured to the periphery thereof and said second material is ring-shaped and secured to the outer periphery of the base member.

16. The condition sensor of claim 1 wherein said base member is a circular plate and said mounting means is secured to the periphery thereof and said second material is ring-shaped and secured to the outer periphery of the base member, and a third material having a coefficient corresponding to said second material and applied as a central disc member to the opposite surface of said base member from said second material.

17. A bi-material humidity sensor adapted to establish a deflection in accordance with the sensed condition comprising
a flexible base member having a predetermined humidity coefficient of expansion, said base member being a substantially planar member,
fixed mounting means connected at opposite sides of said base member to rigidly support said element at said opposite sides, and
a layer of cellulose acetate butyrate cross-linked with urea-formaldehyde and directly bonded to said base member and having a different humidity coefficient of expansion, said layer being spaced from said mounting means and the periphery of said base member to establish a free uncovered portion of said base member.

18. The condition sensor of claim 17 wherein said base member is an aluminum plate-like member having the surface to which said second material is secured having a thin zinc plated layer covered by a thin copper plated layer, said copper layer being oxidized to improve the adhesion of the second layer.

19. In a bi-material sensor in accordance with claim 1 wherein said second material is a reaction product of a compound containing glucoside chains and a stabilizing monomer or partial polymer capable of cross-linking with the hydroxyl groups of said glucoside.

20. A bi-material condition sensor element adapted to be fixedly and rigidly mounted at a pair of oppositely located areas of the element and establishing a deflection therebetween in accordance with the sensed condition comprising
a substantially planar base member having a predetermined coefficient of expansion for said condition, and
a second material having a different coefficient of expansion for said condition and integrally bonded through the interface of the base member and the second material to a selected portion of said base member throughout, said selected portion being substantially less than the area of said base member to establish a free uncovered portion of said base member.

21. The condition sensor of claim 20 wherein said base member is a circular plate adapted to be fixedly mounted about the periphery thereof and said second material is secured to the center of the base member.

22. The condition sensor of claim 20 wherein said base member is a circular plate adapted to be fixedly mounted about the periphery thereof and said second material is secured to the outer peripheral portion thereof.

23. The bi-material condition sensor of claim 1, wherein said fixed mounting means is connected essentially to the full periphery of said base member and said second material is symmetrically secured to the base member.

* * * * *

UNITED STATES PATENT OFFICE
CERTIFICATE OF CORRECTION

Patent No. 3,665,765                    Dated May 30, 1972

Inventor(s) VICTOR J. DUBE, PAUL E. THOMA and JAO SHIUN KAO

It is certified that error appears in the above-identified patent and that said Letters Patent are hereby corrected as shown below:

Column 3, Line 34, after "alloy" cancel "110-0" and insert --- 1100-0 ---;

Column 5, Line 8, after "l" insert --- an oblique sign (/) ---;

Column 5, Line 62, cancel (1 v) and insert --- (1-v) ---

Column 7, Line 52 at the beginning of the line insert --- $M_{01} =$ ---;

Column 7, Line 58, cancel the "equal sign (=) second occurrence, and insert --- a minus sign (—) ---;

Signed and sealed this 26th day of December 1972.

(SEAL)
Attest:

EDWARD M. FLETCHER, JR.
Attesting Officer

ROBERT GOTTSCHALK
Commissioner of Patents